(12) United States Patent
Kizaki et al.

(10) Patent No.: US 7,782,473 B2
(45) Date of Patent: Aug. 24, 2010

(54) APPARATUS FOR TRANSFORMING IMAGE DATA FOR ANOTHER AND METHOD

(75) Inventors: Osamu Kizaki, Saitama (JP); Hidenori Shindoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1313 days.

(21) Appl. No.: 10/849,827

(22) Filed: May 21, 2004

(65) Prior Publication Data

US 2005/0157322 A1    Jul. 21, 2005

(30) Foreign Application Priority Data

May 22, 2003    (JP)    ............................. 2003-144573

(51) Int. Cl.
    G06F 3/12     (2006.01)
    G06K 15/00    (2006.01)
    H04N 1/21     (2006.01)
    H04N 1/00     (2006.01)

(52) U.S. Cl. .................... 358/1.13; 358/1.15; 358/1.16; 358/403; 358/426.02

(58) Field of Classification Search ................ 358/1.18, 358/448, 1.13, 1.6, 468, 442, 402, 401, 1.15, 358/407, 1.2; 715/523; 382/239, 154; 348/14.01, 348/207.1, 231.6, 523, 14.02; 375/222
See application file for complete search history.

(56) References Cited

U.S. PATENT DOCUMENTS

| 5,140,675 A | * | 8/1992 | Okada ........................ 358/1.15 |
| 5,381,242 A | * | 1/1995 | Fujii ............................ 358/468 |
| 5,434,650 A | | 7/1995 | Nakahara et al. |
| 5,485,246 A | | 1/1996 | Hayashi et al. |
| 5,510,876 A | | 4/1996 | Hayashi et al. |
| 5,513,212 A | * | 4/1996 | Bremer ........................ 358/434 |
| 5,546,164 A | | 8/1996 | Hayashi et al. |
| 5,583,615 A | | 12/1996 | Hashimoto et al. |
| 5,694,201 A | | 12/1997 | Hayashi et al. |

(Continued)

FOREIGN PATENT DOCUMENTS

JP    2000-270146    9/2000

(Continued)

OTHER PUBLICATIONS

U.S. Appl. No. 08/069,350, filed May 28, 1993.

(Continued)

*Primary Examiner*—King Y Poon
*Assistant Examiner*—Akwasi M Sarpong
(74) *Attorney, Agent, or Firm*—Oblon, Spivak, McClelland, Maier & Neustadt, L.L.P.

(57) ABSTRACT

A method of transforming an image format of image data stored in an apparatus connected via a network is disclosed. The method includes the steps of providing the apparatus with format information containing image formats of image data that can be transformed, receiving a request for transforming the image format of the image data from the apparatus, acquiring the image data from the apparatus, transforming the image format of the image data acquired from the apparatus thereby to form format-transformed image data, and providing the format-transformed image data to the apparatus. According to the above arrangements, an image transforming apparatus using the method can transform the image format of the image data on behalf of the apparatus.

21 Claims, 16 Drawing Sheets

U.S. PATENT DOCUMENTS

| | | | |
|---|---|---|---|
| 5,784,663 A | 7/1998 | Hayashi et al. | |
| 5,812,900 A | 9/1998 | Hashimoto et al. | |
| 5,897,236 A | 4/1999 | Hashimoto et al. | |
| 5,915,156 A | 6/1999 | Kizaki et al. | |
| 5,966,564 A | 10/1999 | Kizaki et al. | |
| 6,026,255 A | 2/2000 | Kizaki et al. | |
| 6,122,457 A | 9/2000 | Kizaki | |
| 6,230,189 B1* | 5/2001 | Sato et al. | 358/401 |
| 6,704,775 B1* | 3/2004 | Sato et al. | 358/407 |
| 6,775,404 B1* | 8/2004 | Pagoulatos et al. | 382/154 |
| 7,039,869 B2* | 5/2006 | Smith | 358/1.18 |
| 7,069,314 B1* | 6/2006 | Aoki et al. | 358/1.6 |
| 7,193,649 B2* | 3/2007 | Billerbeck | 348/207.1 |
| 7,366,757 B1* | 4/2008 | Ushida | 358/442 |
| 2002/0089702 A1* | 7/2002 | Yoshitani et al. | 358/448 |
| 2002/0118390 A1* | 8/2002 | Easwar et al. | 358/1.18 |
| 2003/0020960 A1* | 1/2003 | Tanimoto | 358/402 |
| 2003/0020961 A1* | 1/2003 | Tanimoto | 358/402 |
| 2003/0037302 A1* | 2/2003 | Dzienis | 715/523 |
| 2003/0044076 A1* | 3/2003 | Mitchell et al. | 382/239 |
| 2003/0112324 A1* | 6/2003 | Hsu et al. | 348/14.02 |
| 2004/0070780 A1* | 4/2004 | Kimoto | 358/1.13 |
| 2004/0196374 A1* | 10/2004 | Billerbeck | 348/207.1 |

FOREIGN PATENT DOCUMENTS

| | | |
|---|---|---|
| JP | 2002-189684 | 7/2002 |
| JP | 2003-141021 | 5/2003 |

OTHER PUBLICATIONS

U.S. Appl. No. 09/641,915, filed Aug. 21, 2000, Kizaki et al.
U.S. Appl. No. 09/737,960, filed Dec. 18, 2000, Miyazaki et al.
U.S. Appl. No. 09/770,470, filed Jan. 29, 2001, Kizaki et al.
U.S. Appl. No. 09/861,718, filed May 22, 2001, Kizaki.
U.S. Appl. No. 10/207,058, filed Jul. 30, 2002, Kizaki.
U.S. Appl. No. 10/207,125, filed Jul. 30, 2002, Kizaki.
U.S. Appl. No. 10/355,108, filed Jan. 31, 2003, Kizaki.
U.S. Appl. No. 10/637,690, filed Aug. 11, 2003, Shindoh et al.
U.S. Appl. No. 10/667,302, filed Sep. 23, 2003, Shindoh et al.

* cited by examiner

FIG.7

| IMAGE TRANSFORMATION SPEED | TRANSFORMABLE MAGNIFICATION RANGE | | | | | | | | | |
|---|---|---|---|---|---|---|---|---|---|---|
| AA Mbyte/s | MIN%–MAX% | | | | | | | | | |
| | | TYPE 1 | TYPE 2 | TYPE 3 | TYPE 4 | TYPE 5 | TYPE 6 | TYPE 7 | TYPE 8 | TYPE 9 | TYPE 10 |
| | | ○ | × | ○ | ○ | ○ | ○ | ○ | ○ | ○ | ○ |

|  |  | INPUT FORMAT | | | |
|---|---|---|---|---|---|
| OUTPUT FORMAT | | FORMAT A | FORMAT B | FORMAT C | FORMAT D |
| | FORMAT A | — | TYPE 1 | TYPE 2 | TYPE 3 |
| | FORMAT B | TYPE 4 | — | TYPE 5 | TYPE 6 |
| | FORMAT C | TYPE 7 | TYPE 8 | — | TYPE 9 |
| | FORMAT D | TYPE 10 | TYPE 11 | TYPE 12 | — |

APPARATUS FOR TRANSFORMING IMAGE DATA FOR ANOTHER AND METHOD

BACKGROUND OF THE INVENTION

1. Field of the Invention

The present invention generally relates to an image transformation apparatus, and more particularly, to an image transformation apparatus that transforms image data for another apparatus connected via a network, and a method of transforming the image data.

2. Description of the Related Art

There are many formats of image data. For example, JPEG is one of the most common formats of image data used for personal computers. MH, MR, and MMR are generally used for facsimile machines. Each format is designed for a specific purpose of use and an environment.

It is often necessary to transform image data of a format into image data of another format. For example, when JPEG image data are to be transmitted via facsimile, the JPEG image data need to be transformed into MH, MR, or MMR.

In such a case, a user may use various apparatuses such as a personal computer in which a computer program for transforming image data format is installed, and a multifunction peripheral that functions as a copier and a scanner, for example, as well as a facsimile, depending on the occasion.

However, even image data can be easily transmitted via a network because of the improvements in network technology. If an apparatus can request another apparatus connected via a network to transform image data on its behalf, the apparatus does not need to have a transformation unit for transforming image data. If the apparatus has its own transformation unit for transforming image data, but the other apparatus has a transformation unit of a higher performance level, the apparatus may be able to transform the image data at a higher efficiency by requesting the other apparatus to transform the image data.

SUMMARY OF THE INVENTION

Accordingly, it is a general object of the present invention to provide a novel and useful image transformation apparatus in which at least one of the above problems is eliminated.

Another and more specific object of the present invention is to provide an image transformation apparatus that transforms image data for another apparatus connected via a network, and a method of transforming image data for another apparatus.

To achieve at least one of the above objects, the method according to the present invention is capable of transforming an image format of image data stored in an apparatus connected via a network, the method including the steps of:

providing the apparatus with format information containing image formats of image data that can be transformed;

receiving a request for transforming the image format of the image data from the apparatus;

acquiring the image data from the apparatus;

transforming the image format of the image data acquired from the apparatus thereby to form format-transformed image data; and providing the format-transformed image data to the apparatus.

According to the above arrangements, if the apparatus is not capable of transforming the image format of the image data, or the capability of the apparatus is inferior to that of the image transforming apparatus, the image transforming apparatus, using the method, can transform the image format of the image data in response to a request from the apparatus.

Other objects, features, and advantages of the present invention will become more apparent from the following detailed description when read in conjunction with the accompanying drawings.

BRIEF DESCRIPTION OF THE DRAWINGS

FIG. 7 is a table of exemplary resource information according to an embodiment;

FIG. 8 is an exemplary table that correlates a combination of an input format and an output format to a transformation type according to an embodiment;

DETAILED DESCRIPTION OF THE PREFERRED EMBODIMENTS

The preferred embodiments of the present invention are described in detail below. In the following description, image data may be referred to as an image, and the transforming of the format of image data may be referred to as the transforming of an image. Additionally, it is assumed in the following description that an image transformation apparatus is a multifunction peripheral (MFP), which may be referred to as a "machine". However, the image transformation apparatus is not limited to the MFP.

Figure 1:
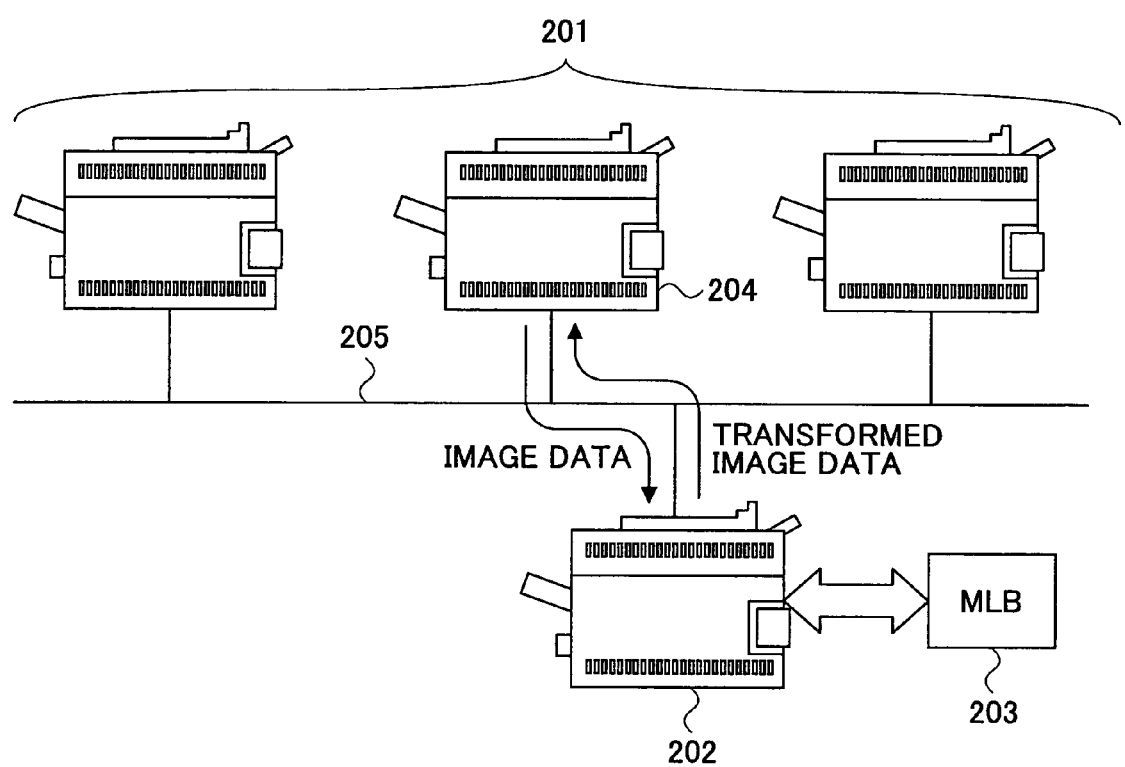
FIG. 1 is a network diagram for explaining a system according to an embodiment.

FIG. 1 is a network diagram for explaining the outline of the preferred embodiments. The network system shown in FIG. 1 includes MPFs 201 and another MFP 202 in which a media link board (MLB) 203 for transforming images is installed, connected via a network 205. The MLB 203 is generally built within the MFP 202. However, in FIG. 1, the MLB 203 is shown outside of the MFP 202.

As shown in FIG. 1, the MFP 202 serves the MFP 204 (one of the MFPs 201 connected to the MFP 204 via the network 205) for transforming images.

According to the above arrangements, even if the MFP 204 has no built-in MLB, the MFP 204 can have images transformed by the MLB 203 of the MFP 202. If the MFP 204 has a low-performance MLB (not shown), but the MLB 203 of the MFP 204 is of high performance, the MFP 204 can have images transformed by the high-performance MLB 203 of the MFP 202.

Figure 2:
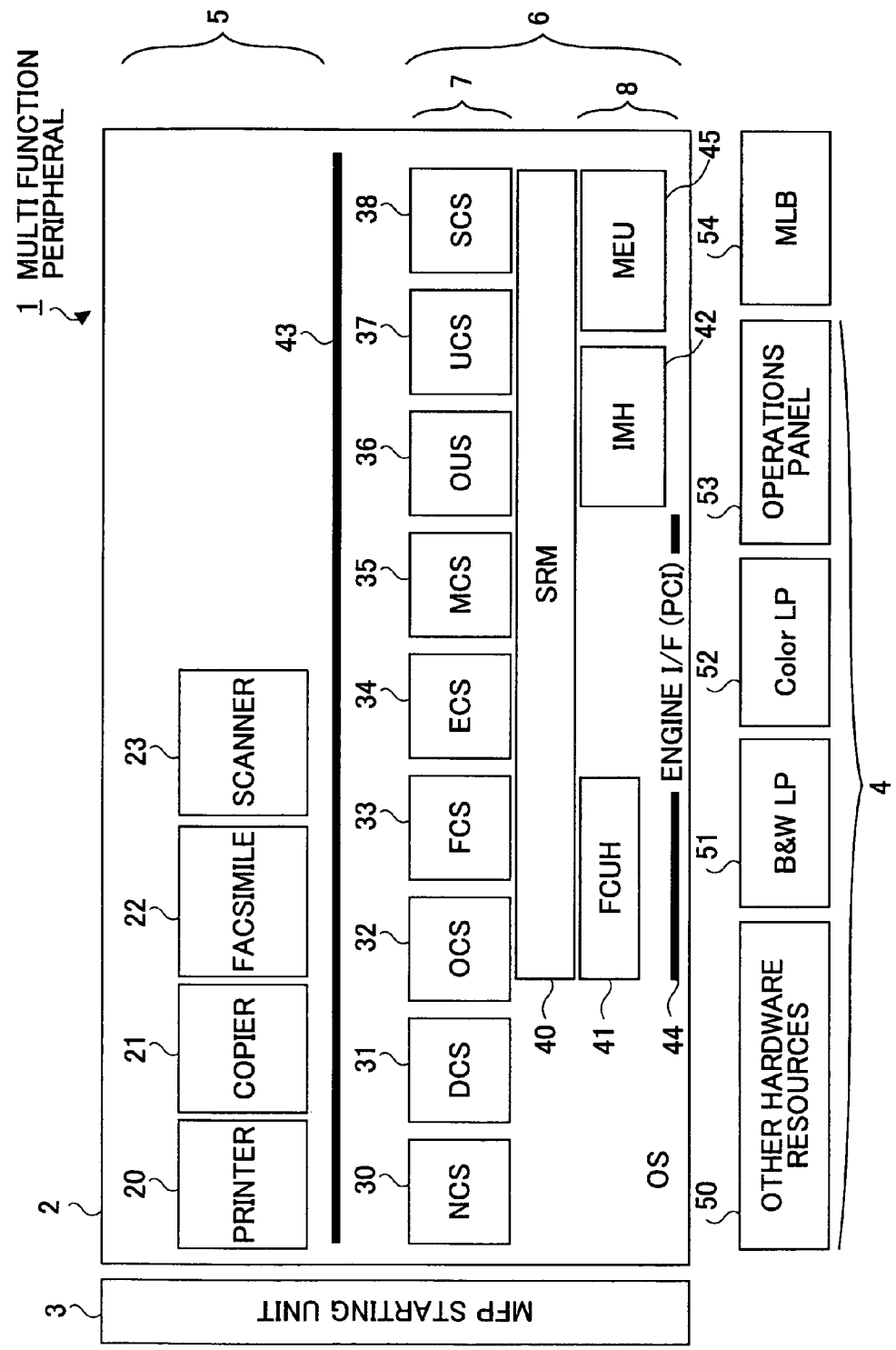
FIG. 2 is a block diagram showing a multifunction peripheral according to an embodiment.

The structure and operation of the MFP are described below. FIG. 2 is a schematic diagram showing the configuration of a MFP 1. The MFP 1 includes computer programs 2 that perform the image forming, a MFP starting unit 3, and hardware resources 4 that are used for the image forming.

When the MFP 1 is powered on, the MFP start unit 3 is started first, and activates an application layer 5 and a platform layer 6. The MFP starting unit 3 reads programs of the application layer 5 and the platform layer 6 from a hard disk drive (HDD) (not shown) and loads the programs to a memory region (not shown), for example, and activates the programs. The hardware resources 4 include a monochrome laser printer 51, a color laser printer 52, an operations panel 53, the MLB 54, and other hardware resources 50 such as a scanner and a facsimile unit.

The software programs 2 are executed on an operating system OS such as UNIX (registered trade mark). The software programs 2 include the application layer 5 and the platform layer 6. The application layer 5 includes programs that perform specific user services related to the image forming such as printing, copying, facsimile, and scanning.

The application layer 5 includes a printer application 20 corresponding to printing functions, a copier application 21 corresponding to copying functions, a facsimile application 22 corresponding to facsimile functions, and a scanner application 23 corresponding to scanning functions.

The platform layer 6 includes a control service layer 7, a system resource manager (SRM) 40, and a handler layer 8. The control service layer 7 interprets a request for processing data from the application layer 5, and issues a request for allocating the hardware resources 4. The SRM 21 manages one or more hardware resources 4 to arbitrate requests for allocating the hardware resources 4 from the control service layer 7. The handler layer 8 handles the hardware resources 4 in accordance with a request for allocating the hardware resources 4 from the SRM 40.

The control service layer 7 includes one or more service modules such as: a network control service (NCS) 30, a delivery control service (DCS) 31, an operations panel control service (OCS) 32, a facsimile control service (FCS) 33, an engine control service (ECS) 34, a memory control service (MCS) 35, an on-demand update service (OUS) 36, a user information control service (UCS) 37, and a system control service (SCS) 38.

The platform layer 6 is configured to include an application program interface (API) 43 through which the application layer 5 sends processing requests to the platform layer 6 by issuing a function call. Programs of the application layer 5 and the platform layer 6 may be simultaneously executed on an operating system (OS) as processes.

The process of the NCS 30 provides a common service available for all application programs that require network interface. The process of the NCS 30 receives data from another resource connected to the network in accordance with various protocols, and transfers the received data to a designated application program, and vice versa.

The NCS 30 communicates with another network apparatus via the network using a HyperText Transfer Protocol Daemon (httpd) in accordance with the HyperText Transfer Protocol (HTTP).

The process of the DSC 31 controls the distribution of documents stored in the MFP 1. The process of the OCS 32 controls an operations panel through which a user (or a service person who maintain the MFP 1) and the system of the MFP 1 communicate.

The process of the FCS 33 provides the application layer 5 with the application program interface (API) 43 through which the application layer 5 can exchange facsimile messages via PSTN and/or ISDN. The application layer 5 can further register and retrieve facsimile messages stored and managed in a backup memory (not shown) through the API 43. The application layer 5 can read and print the facsimile messages through the API.

The process of the ECS 34 controls engines such as those of the monochrome laser printer 51, the color laser printer 52, and the other hardware resources 50. The process of the MCS 35 manages memory (storage) such as the HDD by reserving and/or discharging a memory region. The process of the OUS 36 downloads programs via the network, and stores the downloaded programs in the memory.

The process of the SCS 38 manages the application programs, controls the operations unit, displays system screens, indicates information via LEDs, manages the hardware resources, and controls interruption of applications, for example.

The process of the SRM 40 controls the system of the MFP 1 and manages the hardware resources 4 in cooperation with the SCS 38. The process of the SRM 40 arbitrates requests for allocating the hardware resources 4 from the upper rank layer thereby to control the use of the hardware resources 4. The process of the SRM 40 schedules the use of the hardware resources 4 in response to a request from the upper rank layer. For example, the process of the SRM 40 directly controls paper transportation and image forming of the printer engines, memory reservation, and file creation.

The handler layer 8 includes a facsimile control unit handler (FCUH) 41, an image memory handler (IMH) 42, and a MEU 45. As will be appreciated, the FCUH 41 controls a facsimile control unit (FCU) 68 (see FIG. 3). The IMH 42 allocates memory regions to processes, and manages the allocated memory regions. The MEU 45 gives the MLB 54 instructions for transforming images.

The SRM 40 and FCUH 41 give the hardware resources 4 requests for processing through an engine interface (I/F) 44 by using a predetermined function.

As described above, the MFP 1 can centrally perform processing commonly required by the applications of application layer 5. The hardware structure of the MFP 1 is described next.

Figure 3:
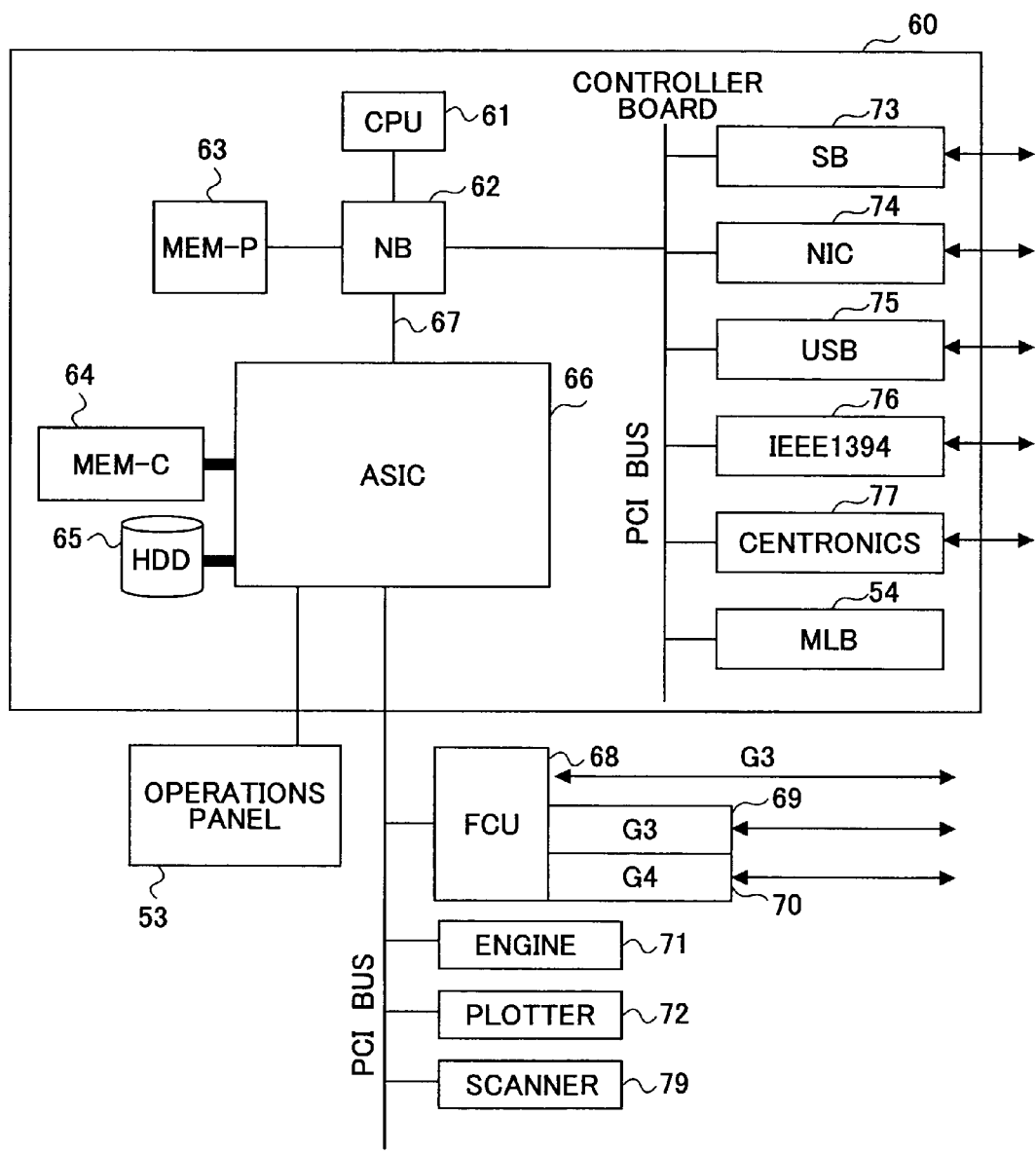
FIG. 3 is a hardware diagram showing the multifunction peripheral shown in FIG. 2.

FIG. 3 is a schematic diagram showing the hardware structure of the MFP 1 according to an embodiment. The MFP 1 includes a controller board 60, an operations panel 53, the FCU 68, an engine 71, and a plotter 72. The FCU 68 includes a G3 unit 69 and a G4 unit 70.

The controller board 60 includes the following: a CPU 61, an ASIC 66, a HDD 65, a local memory (MEM-C) 64, a system memory (MEM-P) 63, a north bridge (NB) 62, a south bridge (SB) 73, a network interface card (NIC) 74, a USB device 75, an IEEE 1394 device 76, and a Centronics device 77.

The operations panel 53 is connected to the ASIC 66 mounted on the controller board 60. The following are connected to the NB 62 via a PCI bus: the SB 73, the NIC 74, the USB device 75, the IEEE 1394 device 76, the Centronics device 77, and the MLB 54. The MLB 54 is connected to the image transformation apparatus (MFP 1) via the PCI bus. The image data are provided from the MFP 1 to the MLB 54, are transformed by the MLB 54, and returned from the MBL 54 to the MFP 1.

The FCU 68, the engine 71, and the plotter 72 are connected to the ASIC 66 of the controller board 60 via the PCI bus.

On the controller board 60, the local memory 64 and HDD 65 are connected to the ASIC 66, and the CPU 61 and ASIC 66 are connected to each other via the NB 62 (a CPU chip set). Even if the interface of the CPU 61 is not known, the ASIC 66 can be connected to the CPU 61 via the NB 62.

The ASIC 66 and the NB 62 are connected via an accelerated graphics port (AGP) 67, instead of the PCI bus. The reason why the ASIC 66 and the NB 62 are connected to each other via the AGP 67, which is faster than the PCI bus, is that multiple processes of the application layer 5 and the platform layer 6 need to be executed concurrently without degrading the performance of the system.

The CPU 61 controls the entire system of the MFP 1. The CPU 61 executes the following programs on the operating system as processes: the NCS 30, DCS 31, OCS 32, FCS 33, ECS 34, MCS 35, OUS 36, UCS 37, SCS 38, SRM 40, FCUH 41, and the IMH 42. The CPU 61 further executes the printer application 20, the copier application 21, the facsimile application 22, and the scanner application 23.

The NB 62 is a bridge device that connects the CPU 61 with the system memory 63, the SB 73 and the ASIC 66. The system memory 63 is the memory for storing image data for image forming of the MFP 1. The SB 73 is a bridge device that connects the NB 62, through the PCI bus, with and other peripheral devices. The local memory 64 is the memory for buffering copier image data and codes.

The ASIC 66 is an application specific integrated circuit that includes hardware elements for image processing. The HDD 65 is a storage device for storing images, documents, computer programs, fonts, and forms, for example. The operations panel 53 accepts instructions input by the user, and displays information for the user.

Figure 4:
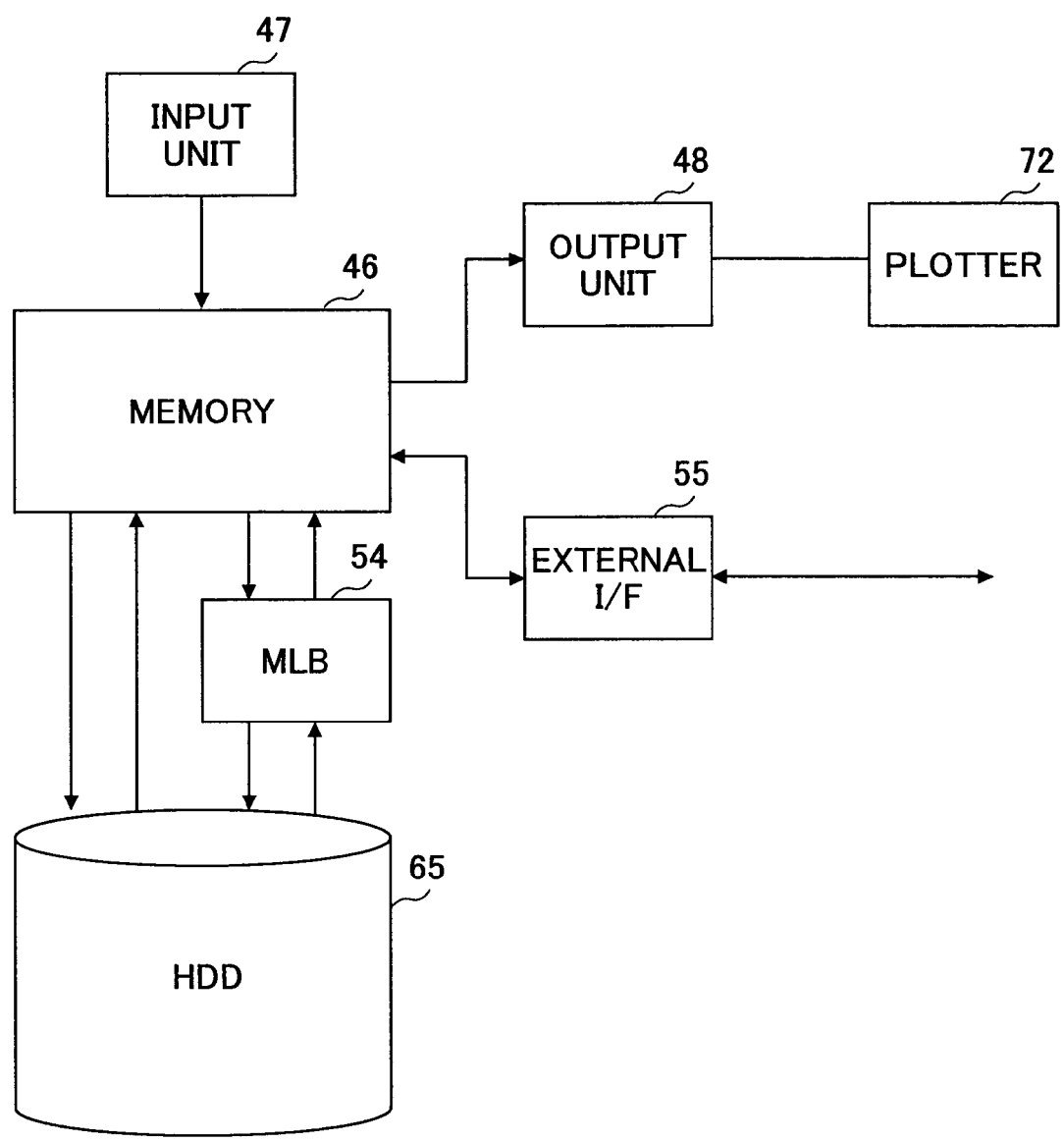
FIG. 4 is a schematic diagram for explaining the flow of image data and related configuration according to an embodiment.

The flow of image data in the MFP 1 and the configuration of the MFP 1 related to the flow of the image data are described below. FIG. 4 is a schematic diagram showing the configuration of the MFP 1 including an input unit 47, a memory 46, the MLB 54, the HDD 65, an output unit 48, a plotter 72, and an external interface (I/F) 55.

The input unit 47 operates to input images used for copying, printing, facsimile, and scanning. The memory 46 stores the images input through the input unit 47 and images received through the external I/F 55. Either the system memory (MEM-P) 63 or the local memory (MEM-C) 64 may operate as the memory 46. The HDD 65 also stores the input images through the input unit 47 and the external I/F 55.

The MLB 54 transforms the format of images stored in the memory 46 or the HDD 65. The plotter 72 prints the images provided by the output unit 48. The external I/F 55 connects the MFP to the network.

As shown in FIG. 4, the images input through the input unit 47 or the external I/F 52 are directly stored in the HDD 65, or stored in the HDD 65 after being transformed by the MLB 54.

A description of the formats of images that are input to the input unit 47 is given below. The formats of images that are input through the input unit 47 include binary, 4-leveled, 8-leveled, MH/MR/MMR, JPEG, RGB, and NFC1, for example. NFC1 is one of plural compression formats.

The MLB 54 can transform images of the following formats: binary, 4-leveled, 8-leveled, MH/MR/MMR, JPEG/JPEG 2000, RGB/sRGB, NFC1, and TIFF, for example. The transformation is performed by MLB 54 that is a hardware device for transforming images at high speed.

The HDD 65 can store images of the following formats: binary, 4-level, 8-level, multi-level, MH/MR/MMR, JPEG, RGB, NFC1, K4, K8, TIFF, and RGB, for example. K4 and K8 are formats for compressed images.

The plotter 72 can accept images of the following formats: binary, 4-level, 8-level, and NFC1.

The external I/F 55 can exchange images of the following formats: binary, 4-level, 8-level, MH/MR/MMR, JPEG, and NFC1.

In the description of the embodiments, it is assumed that the changing of magnification of an image is a part of the transformation of the image. The changing of magnification of an image means the changing of image size, for example, from A4 size to A3 size.

Figure 5:
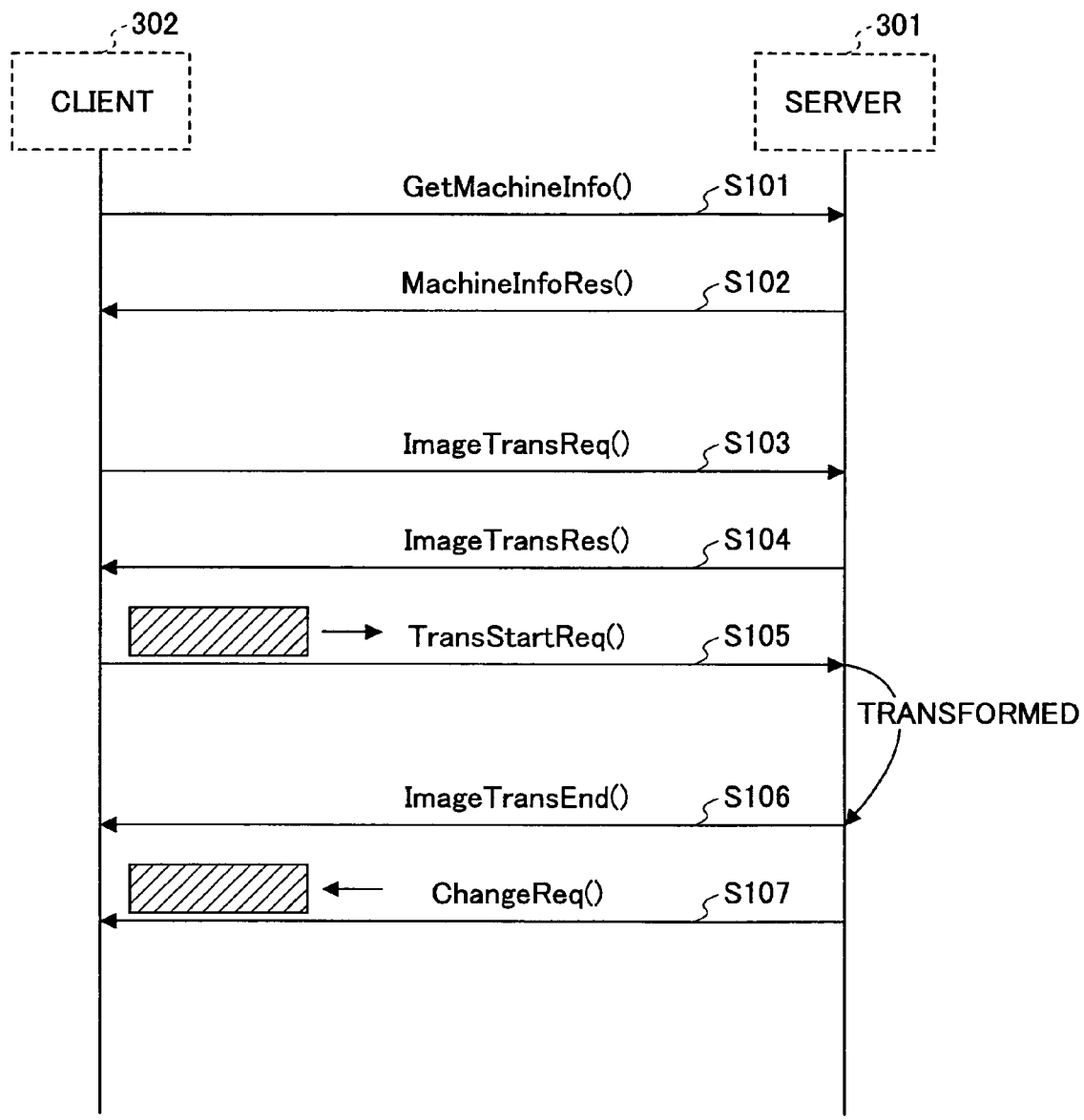
FIG. 5 is a sequence diagram for explaining the transforming of image data according to an embodiment.

FIG. 5 is a sequence chart showing a series of steps performed by the MFP 202 (hereinafter referred to as a server 301) that provides transformation service and the MFP 204 (hereinafter referred to as a client 302) that receives the transformation service from the server 301.

In step S101, when the server 301 is activated, the client 302 detects that the server 301 has been activated, and then, transmits a request "GetMachineInfo" to the server 301 for acquiring resource information of the server 301. The resource information is information related to the transforming of images of the server 301.

The client 302 also transmits information such as an IP address, a department code, a manufacturer code, and a password with the request. In the case of a corporate user, the department code may be used for managing the client by the department of the corporation. According to an embodiment, if the server 301 and the client 302 belong to different departments, a request from the client 302 for accessing the server 301 may be rejected. The password is used for authenticating the client 302.

In step S102, the server 301 transmits the resource information using "MachineInfoRes" in response to receipt of the request "GetMachineInfo". The server 301 transmits a department code, a manufacturer code, image transformation speed, transformable magnification range, and transformable image types to the client 302. For example, the image transformation speed may be represented in units of MB/sec. The transformable magnification range indicates the range of magnifications in which an image can be expanded or reduced. The transformable types is information indicating that, for example, a format A can be transformed into a format B, but cannot be transformed into a format C.

In step S103, when the client 302 requires an image to be transformed, the client 302 transmits a request "ImageTransReq" to the server 301 for transforming the image. The client 302 also transmits the IP address, the department code, the manufacturer code, and the password thereof.

In step S104, in response to receipt of the request, the server 301 returns a response using "ImageTransRes" to the client 302, the response indicating whether the request is "accepted" or "rejected", and further indicating, if the request is "accepted", a URL in which the image to be transformed is to be stored.

If the request is accepted, the client 302 transmits the image to the designated URL and requests the server 301 to start transforming the image using "TransStartReq" in step S105.

The server 301 transforms the format of the image, and in step S106, returns the result of the transformation using "ImageTransEnd" to the client 302. The transformation result indicates either normal completion or abnormal ending. If the transformation result is normal completion, a URL at which the transformed image is placed is designated. The client 302 can acquire the transformed image from the designated URL.

In step S107, the server 301 charges the client 302 for the use of MLB using "ChargeReq". According to an embodiment, the charged amount may change transformation by transformation. The charge may be accumulated using a counter provided to the client 302.

Figure 6:
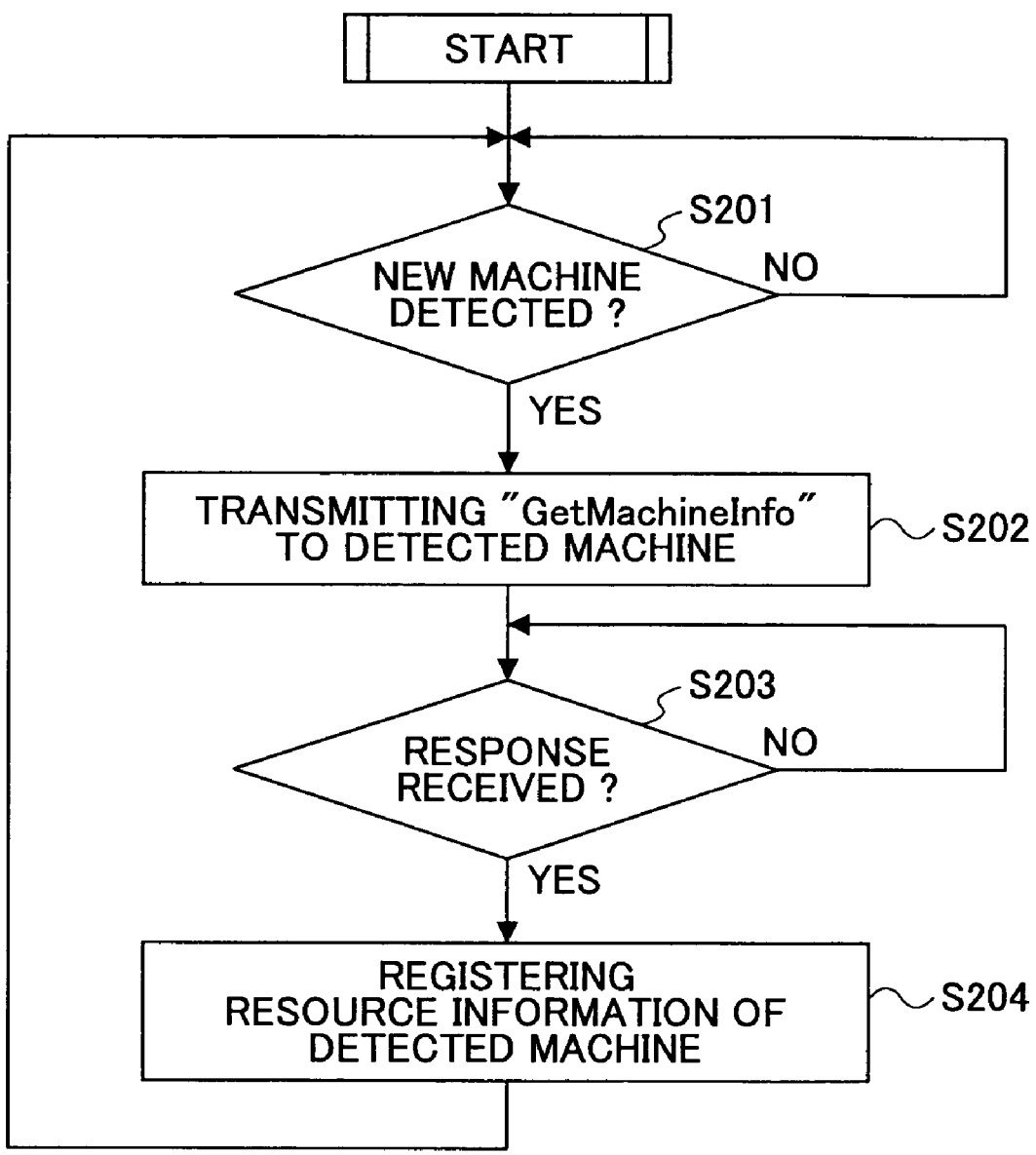
FIG. 6 is a flowchart for explaining the acquiring of resource information according to an embodiment.

Processing performed by the client and the server is described below. FIG. 6 is a flowchart showing steps of the client 302.

In step S201, the client 302 determines whether a new machine is detected, and repeats this step until a new machine is detected. In step S202, when a new machine is detected, the client 302 transmits the request "GetMachineInfo" to the detected machine. In step S203, the client 302 waits for a response from the detected machine. In response to receipt of the response from the detected machine, the client 302 registers the resource information transmitted from the detected machine in step S204.

As described above with reference to FIG. 5, the resource information contains the image transformation speed, the transformable magnification range, and the transformable types. FIG. 7 shows the structure of exemplary resource information. As shown in FIG. 7, the resource information includes the image transformation speed 101, the transformable magnification range 102, and the transformable types 103. The image transformation speed 101 is represented as "AA MB/s". The minimum value of the transformable magnification and the maximum value of the transformable magnification are indicated as MIN %-MAX %, respectively.

The transformable type 103 indicates using "O" or "X" whether a format can be transformed into another format. Specifically, FIG. 7 shows that the type 1 is transformable but type 2 is not.

A type is defined by designating an input format and an output format as shown in FIG. 8. FIG. 8 is an exemplary table that defines the types. For example, the type 7 corresponds to a combination of format A as the input format and format C as the output format. The combination of the format C as the input format and format D as the output format corresponds to type 12.

The client 302 retains the resource information acquired from the server 301. It is assumed in the present embodiment that only one server 301 exists in the network. According to another embodiment, multiple servers in each of which a MLB 54 is installed may exist in a network. In such a case, the client 302 may retain resource information of each server 301.

Figure 9:
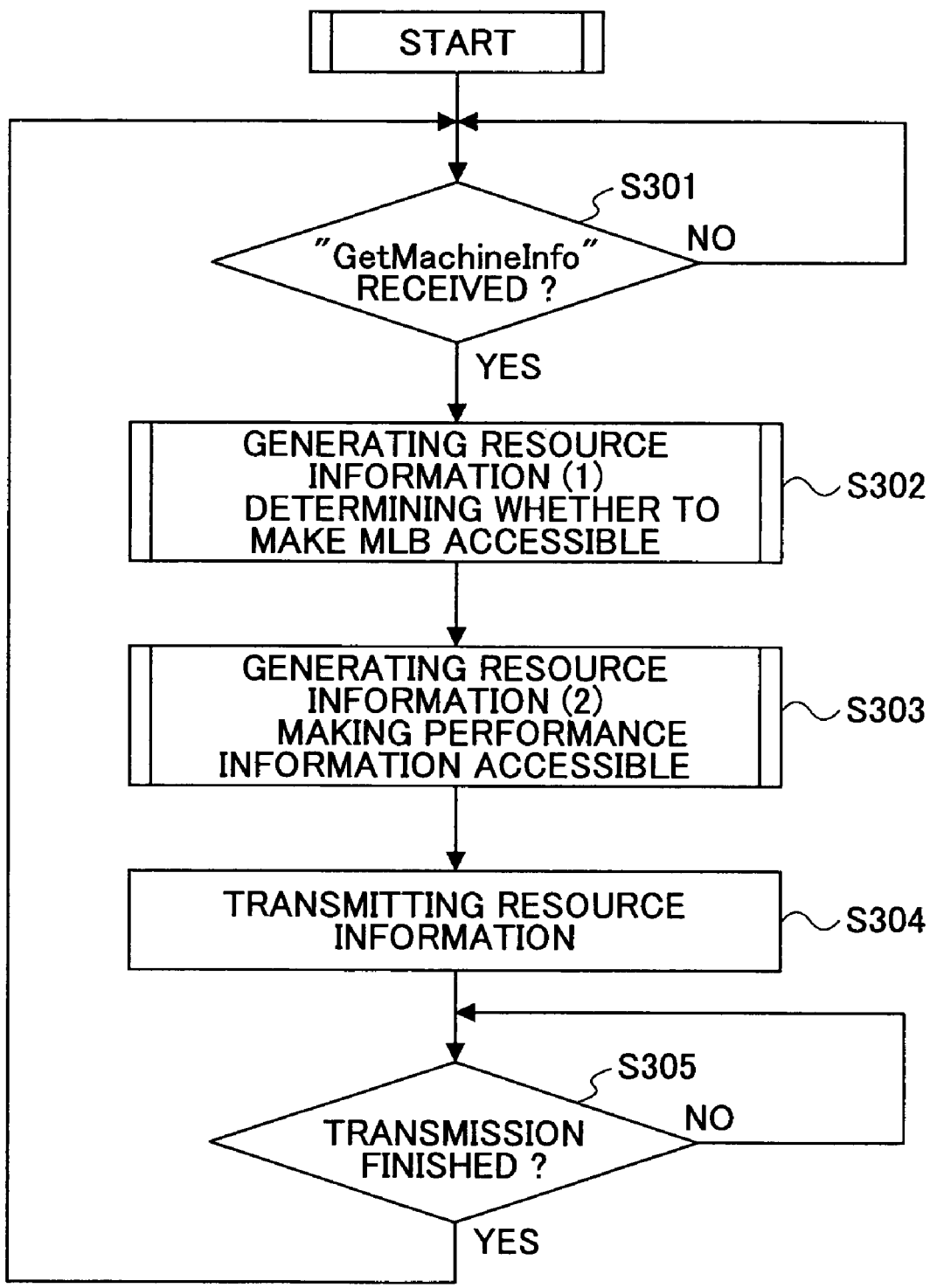
FIG. 9 is a flowchart for explaining processing of a server that receives "GetMachineInfo" according to an embodiment.

FIG. 9 is a flowchart showing the operation of the server 301 that has received a request "GetMachineInfo" from a client 302.

In step S301, the server 301 determines whether a request "GetMachineInfo" has been received, and repeats this step until the determination turns to YES.

In response to receipt of the request "GetMachineInfo", in step S302 the server 301 determines whether the server itself makes the MLB 54 installed therein accessible (GENERATING RESOURCE INFORMATION (1)). This step is described in further detail below. In step S303, the server 301 makes performance information of the MLB 54 installed therein accessible (GENERATING RESOURCE INFORMATION (2)). This step is described in further detail below.

In step S304 subsequent to step S303, the server 301 transmits the resource information to the client using "MachineInfoRes". The server 301 waits until the resource information is transmitted by repeating step S305. If the server 301 determines that the resource information has been transmitted, the process returns to step S301.

Figure 10:
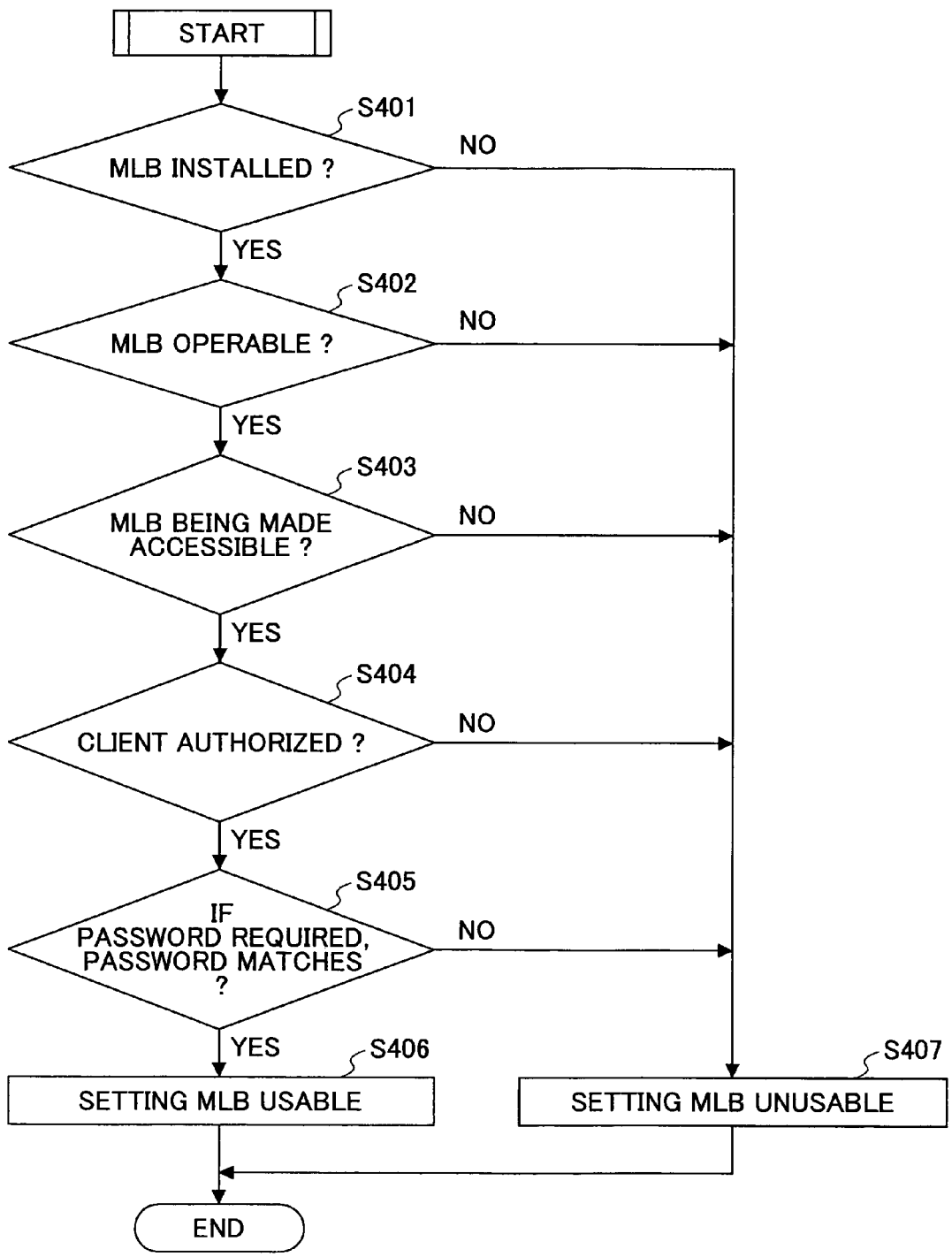
FIG. 10 is a flowchart for explaining processing for generating resource information (1) according to an embodiment.

FIG. 10 is a flowchart for explaining the above step S302 in more detail. In step S401, the server 301 determines whether a MLB 54 is installed therein. If a MLB 54 is not installed therein, the process proceeds to step S407. In step S407, a determination is made that the MLB 54 is not accessible from other apparatuses, and then, the process ends. If a MLB 54 is installed therein (S401 YES), the process proceeds to step S402.

In step S402, the server 301 determines whether the MLB 54 installed therein is normally operable. If the MLB 54 is not normally operable, the process proceeds to step S407 because it makes no sense to make the MLB 54 accessible from the other apparatuses. If the MLB 54 is normally operable, the process proceeds to step S403.

In step S403, the server 301 determines whether it is permitted to make the MLB 54 accessible. If it is not permitted to make the MLB 54 accessible from other apparatuses, the process proceeds to step S407. If it is permitted to make the MLB 54 accessible from other apparatuses, the process proceeds to step S404. According to an embodiment, the permission may be set by a Serviceperson Program (SP).

As described above with reference to FIG. 2, the MLB 54 is connected to other components of the MFP 202 through the PCI bus. If the MLB 54 is made accessible from other apparatuses, the additional accesses (besides accesses from the MFP 202 in which the MLB 54 is installed) may significantly increase traffic on the PCI bus, and consequently degrade the performance of the MFP 202. In such a case, it may be appropriate to determine that the MLB 54 is not accessible from other apparatuses.

In step S404, the server 301 determines whether the requesting client 302 is authorized to access the MLB 54. If the client 302 is not authorized, the process proceeds to step S407. If the client 302 is authorized to access the MLB 54, the process proceeds to step S405. According to an embodiment, the determination may be made by determining whether the client 302 has an operating license for the MLB 54, for example. If the access to the MLB 54 is restricted to clients 302 of a particular department of a firm, accesses from clients 302 belonging to different departments are not authorized.

If the server 301 (MFP 202) requires a password, the server 301 determines whether the password transmitted from the client matches in step S405. If the password does not match, the process proceeds to step S407. If the password matches, the process proceeds to step S406. In step S406, the server 301 determines that the MLB 54 is accessible from other apparatuses, and then, the process ends.

Figure 11:
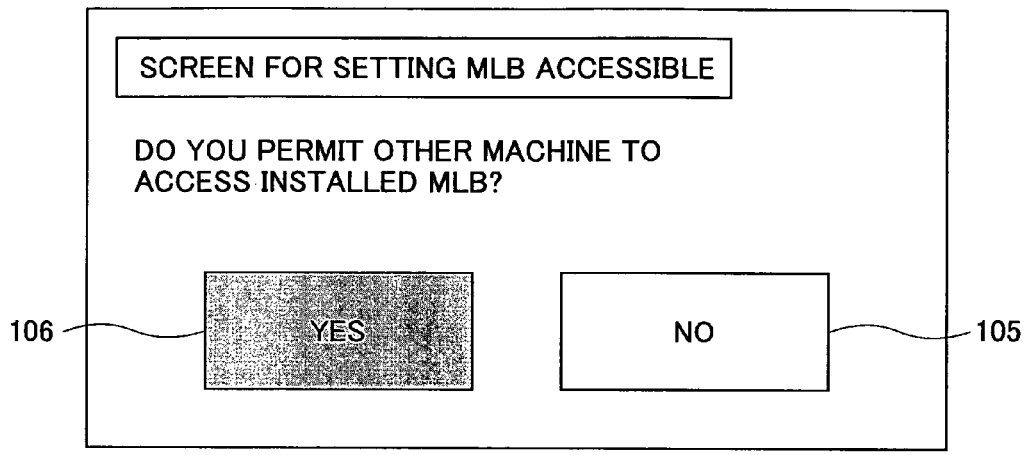
FIG. 11 shows an exemplary screen for setting the MLB accessible from other apparatuses.

A description about the Serviceperson Program is given below. FIG. 11 is an exemplary screen 104 for setting the MLB 54 accessible from other apparatuses. Two buttons 105 and 106 indicating NO and YES, respectively, are provided in the screen 104. The screen 104 may be displayed on the operations panel 53, for example.

A service person or a user can set the MLB 54 accessible or inaccessible by pressing the buttons 106 and 105, respectively, in the screen 104.

Figure 12:
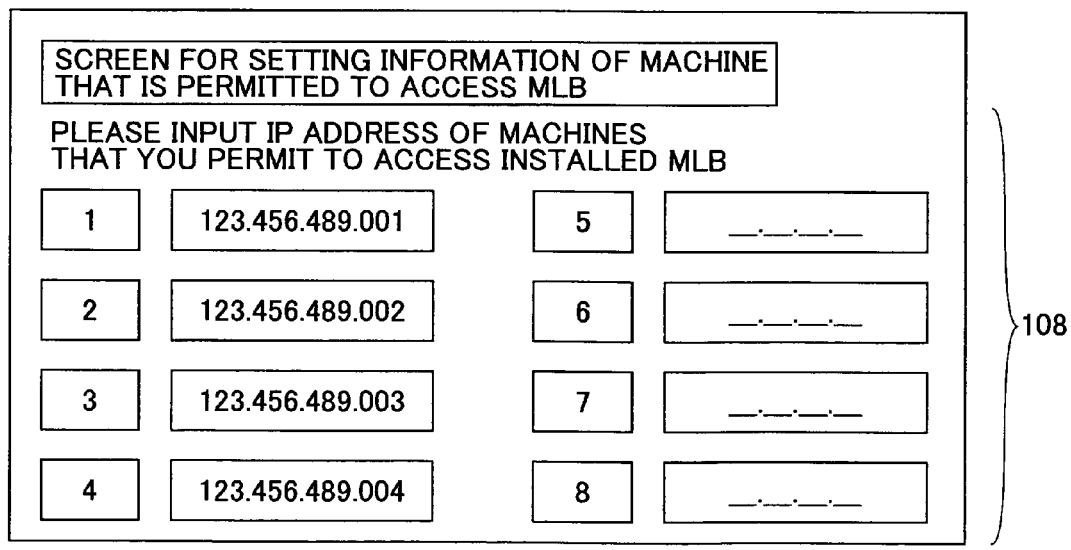
FIG. 12 shows an exemplary screen for setting information of apparatuses that are permitted to access the MLB according to an embodiment.

FIG. 12 is a screen 107 for setting information of machines (apparatuses) that are permitted to access the MLB 54. Boxes 108 in which IP addresses are input are provided in the screen 107. The service person or the user can designate the machines that are permitted to access the MLB 54 by inputting the IP addresses of the machines (apparatuses) in the boxes 108.

Figure 13:
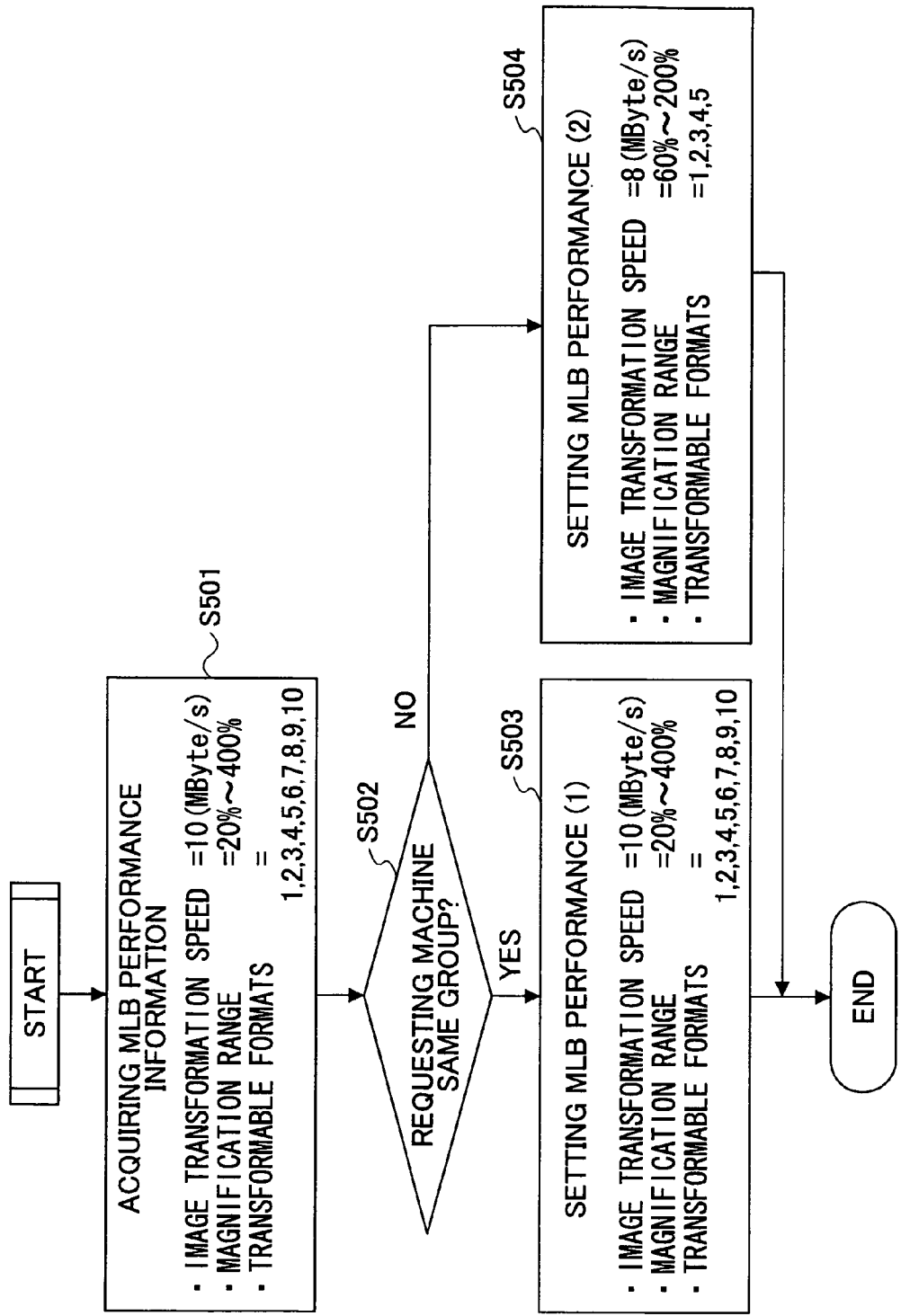
FIG. 13 is a flowchart for explaining step S303 of the flowchart shown in FIG. 9 according to an embodiment.

FIG. 13 is a flowchart for explaining step S303 of the flowchart shown in FIG. 9 in more detail. In step S501, the server 301 acquires the performance of the MLB 54 installed therein. For example, the performance of the MLB 54 is assumed as follows:

IMAGE TRANSFORMATION SPEED=10 (MB/s)
MAGNIFICATION RANGE=20%-400%
TRANSFORMABLE FORMATS=1, 2, 3, 4, 5, 6, 7, 8, 9, 10.

In step S502, the server 301 determines whether the requesting client 302 is in the same group (department, for example). The determination is made for discriminating the quality of service provided to the same group clients 302 from that provided to different group clients 302.

If the requesting client 302 is in the same group, the server 301 sets up the resource information in step 503. For example, the resource information is assumed as follows:

IMAGE TRANSFORMATION SPEED=10 (MB/s)
MAGNIFICATION RANGE=20%-400%
TRANSFORMABLE FORMATS=1, 2, 3, 4, 5, 6, 7, 8, 9, 10. This means that the client 302 of the same group can access the full performance of the MLB 54.

If the requesting client 302 is not of the same group, server 301 sets up the resource information in step S504 in the same manner. However, because the requesting client 302 is not of the same group, the resource information transmitted to the requesting client 302 is assumed as follows:

For example, the performance of the MLB 54 is assumed as follows:

IMAGE TRANSFORMATION SPEED=8 (MB/s)
MAGNIFICATION RANGE=60%-200%
TRANSFORMABLE FORMATS=1, 2, 3, 4, 5.

This means that the client 302 of a different group is permitted to use only a part of the full performance of the MLB 54. According to the above arrangements, the server 301 can give more favorable service to the same group client 302 than it does to a different group client 302.

Figure 14:
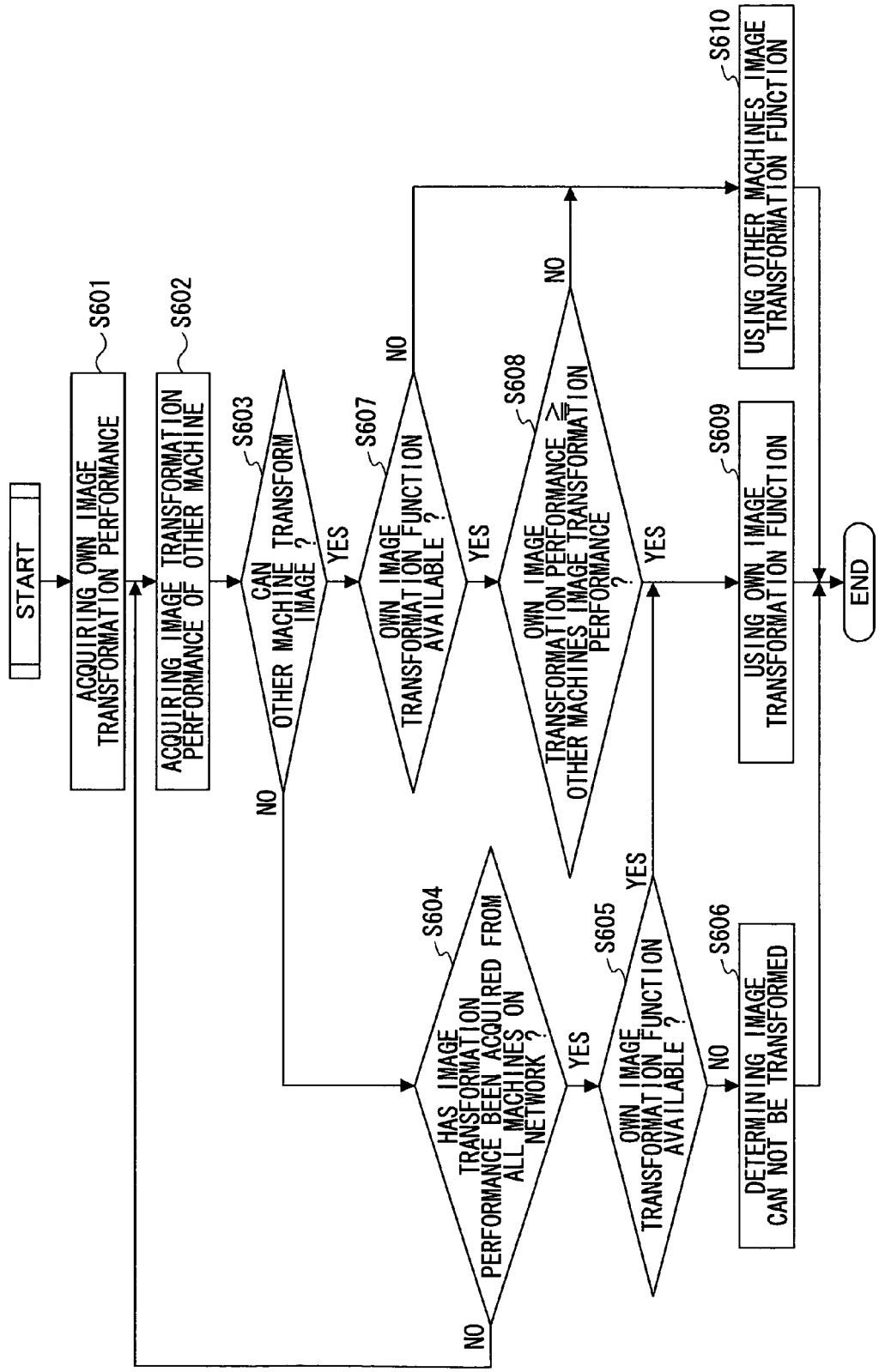
FIG. 14 is a flowchart showing the operation of the client according to an embodiment.

FIG. 14 is a flowchart showing the operation of the client 302. It is assumed in the following description that the client 302 has its own MLB 54 installed therein. According to another embodiment, the client 302 may have software for transforming images instead of the MLB 54.

In step S601, the client 302 acquires the performance information of image transforming of its own MLB 54. If the client 302 has software for transforming images instead of a MLB 54, the client 302 may acquire the performance information of the software. In step S602, the client 302 acquires the performance information of image transforming, that is, the resource information of other machines. As described above, multiple servers 301 may exist in the network. If multiple servers 301 exist in the network, the client 302 receives resource information from each server 301. As a result, steps S602, S603, and S604 form a loop.

In step S603, the client 302 determines whether another machine can transform images based on the acquired resource information from the other machine. If the other machine cannot transform images, the process proceeds to step S604, and further determines whether the resource information of all machines in the network has been received. If the resource information of all machines has not yet been received, the process returns to step S602.

If the client 302 determines in step S604 that the resource information of all machines has been acquired, it means that none of the detected machines has an image transformation function. In step S605, the client determines whether a MLB 54 is installed therein.

If no MLB 54 is installed therein, the client 302 determines in step S606 that images cannot be transformed, and the process ends. If the client 302 determines that a MLB 54 is installed therein, the client 302 transforms the image using the MLB 54 installed therein in step S609, and the process ends.

If the client 302 determines in step S603 that another machine has an image transformation function, the client 302 determines in step S607 whether a MLB 54 is installed therein. If no MLB 54 is installed therein, the client 302 uses the image transformation function of the other machine in step S610, and then, the process ends.

If a MLB 54 is installed therein, the client compares the performance (transformation speed, for example) of the MLB 54 installed therein and the performance of the other machine in step S608. According to the present embodiment, it is assumed that the client compares the transformation speed of the MLBs 54.

If the transformation speed of its own MLB 54 is equal to or greater than that of the MLB 54 of the other machine, the client uses its own MLB 54, and then the process ends. However, if the transformation speed of its own MLB 54 is lower than that of the MLB 54 of the other machine, the client uses the MLB 54 of the other machine in step S610, and then the process ends.

Figure 15:
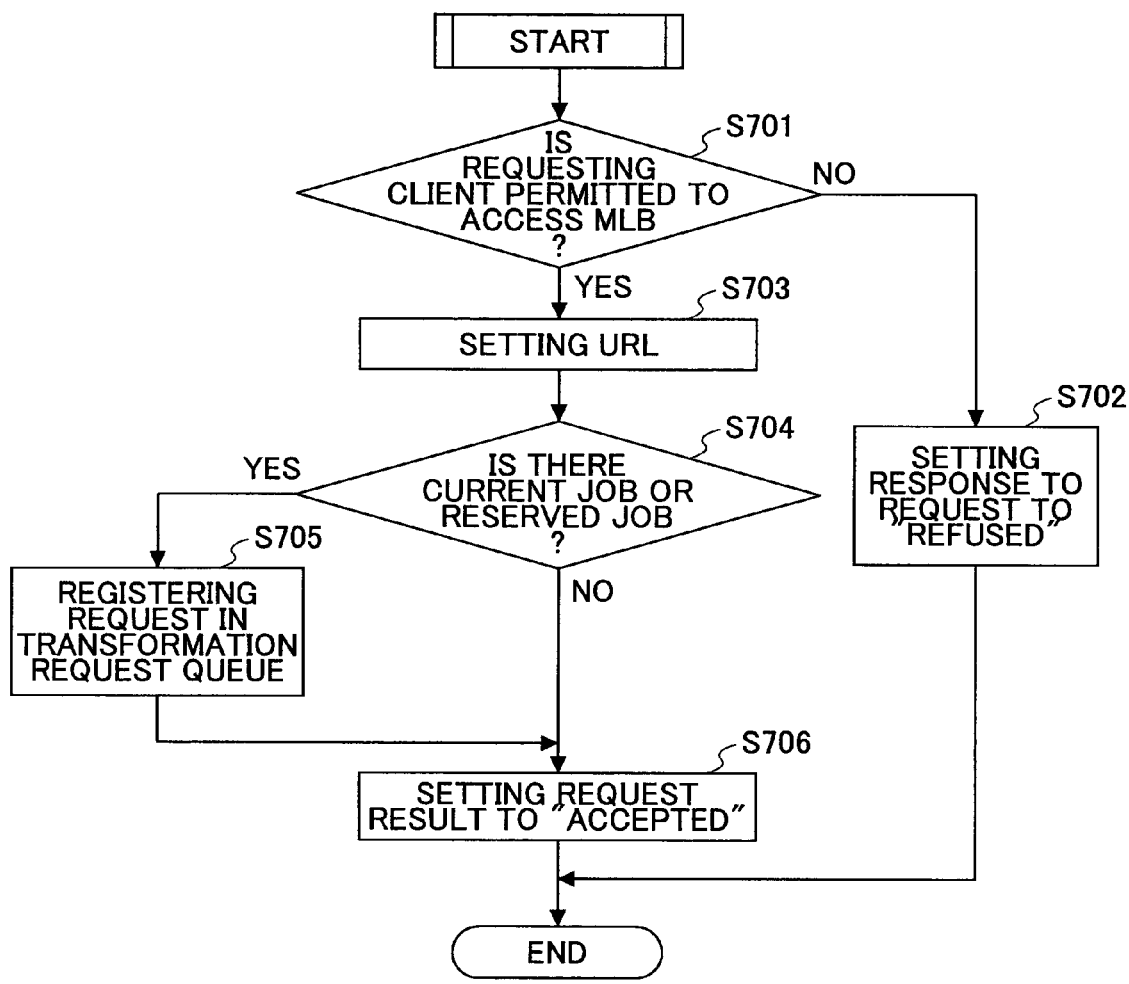
FIG. 15 is a flowchart for explaining an exemplary operation of a server that has received a request for transforming an image from a client according to an embodiment.

FIG. 15 is a flowchart showing exemplary operations of a server 301 that has received a request for transforming an image from a client 302. In step S701, the server 301 determines whether the requesting client 302 is permitted to access the MLB 54. If the requesting client 302 is not permitted to access the MLB 54, the server 301 sets the response to the request to "refused" in step S702, and then, the process ends. The determination may be made based on the IP address and/or the password of the client 302, or based on the traffic rate of the PCI bus. According to another embodiment, the server 301 may accept any request from the client 302, but in such a case, the server 301 may give higher priority to image transformation for itself.

If the requesting client 302 is permitted to access the MLB 54 installed in the server 301, in step S703, the server 301 sets a URL in which the requesting client 302 stores the image that needs to be transformed. In step S704, the server 301 determines whether there is a current job (a job that is to be performed by using the MLB 54) that is currently being performed or a reserved job that needs to be performed.

If there is not a current job or reserved jobs, the server 301 sets the request result as "accepted" in step S706. If there is a current job or a reserved job, in step S705, the server 301 registers the request from the client 302 in a transformation request queue provided in the MLB 54. In step S706, the server 301 sets the request result as "accepted", and then the process ends.

Figure 16:
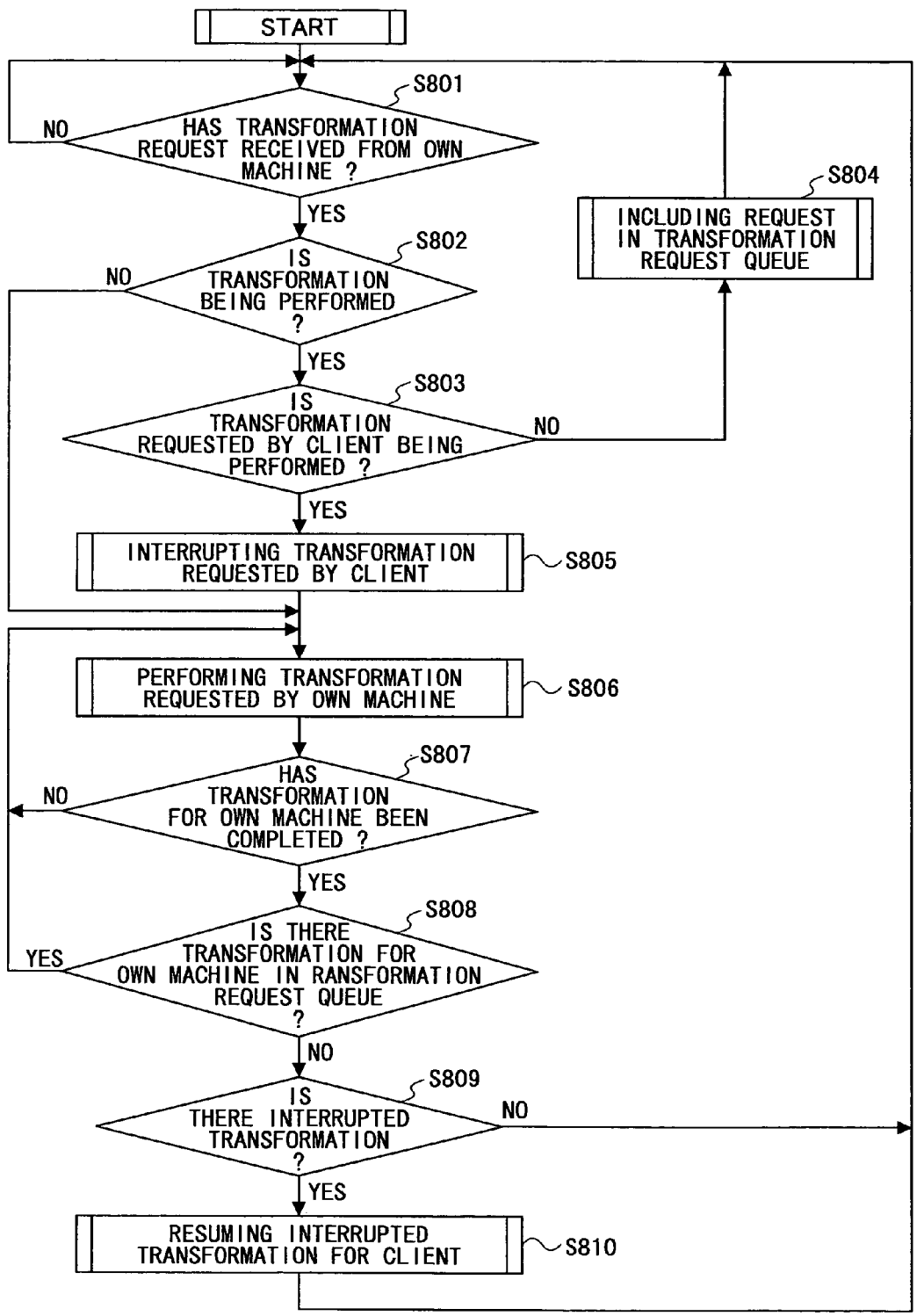
FIG. 16 is a flowchart for explaining exemplary transformation of an image performed by the server according to an embodiment.

FIG. 16 is a flowchart for explaining exemplary transformation of an image performed by the server 301 in the case in which a user of the MFP 202 (server 301) uses the MLB 54 installed therein.

If the server 301 determines that an image needs to be transformed in step S801, the server 301 further determines whether the MLB 54 is currently transforming another image in step S802. If the MLB 54 is not transforming an image, the process proceeds to step S806.

In step S802, if the server 301 determines that the MLB 54 is transforming another image, the server 301 determines in step S803 whether the transformation of the other image is requested by another machine. If the server 301 determines that the transformation of the other image is requested by itself, instead of another machine, the server 301 puts its own request for transforming an image in the transformation request queue in step S804.

In step S803, if the server 301 determines that the transformation of another image is requested by another machine, the server 301 interrupts the currently being performed transformation of another image in step S805 so that its own transformation request is performed at priority.

In step S806, after interrupting the currently being performed transformation of another image, the server 301 performs its own transformation request and transforms the image. The server 301 waits until the transformation of the image is completed in step S807. In response to the completion, the server 301 determines whether its own transformation request is in the transformation request queue in step S808.

If any, the server 301 performs step S806 again. In step S808, if the server 301 determines that its own transformation request is not in the transformation request queue, the server 301 determines whether there is any interrupted request for transforming an image in step S809.

If there is no interrupted request, the server 301 returns to step S801. If there is an interrupted request, the server 301 processes the interrupted request for the other machine. After completing the process, the server 301 returns to step S801.

Figure 17:
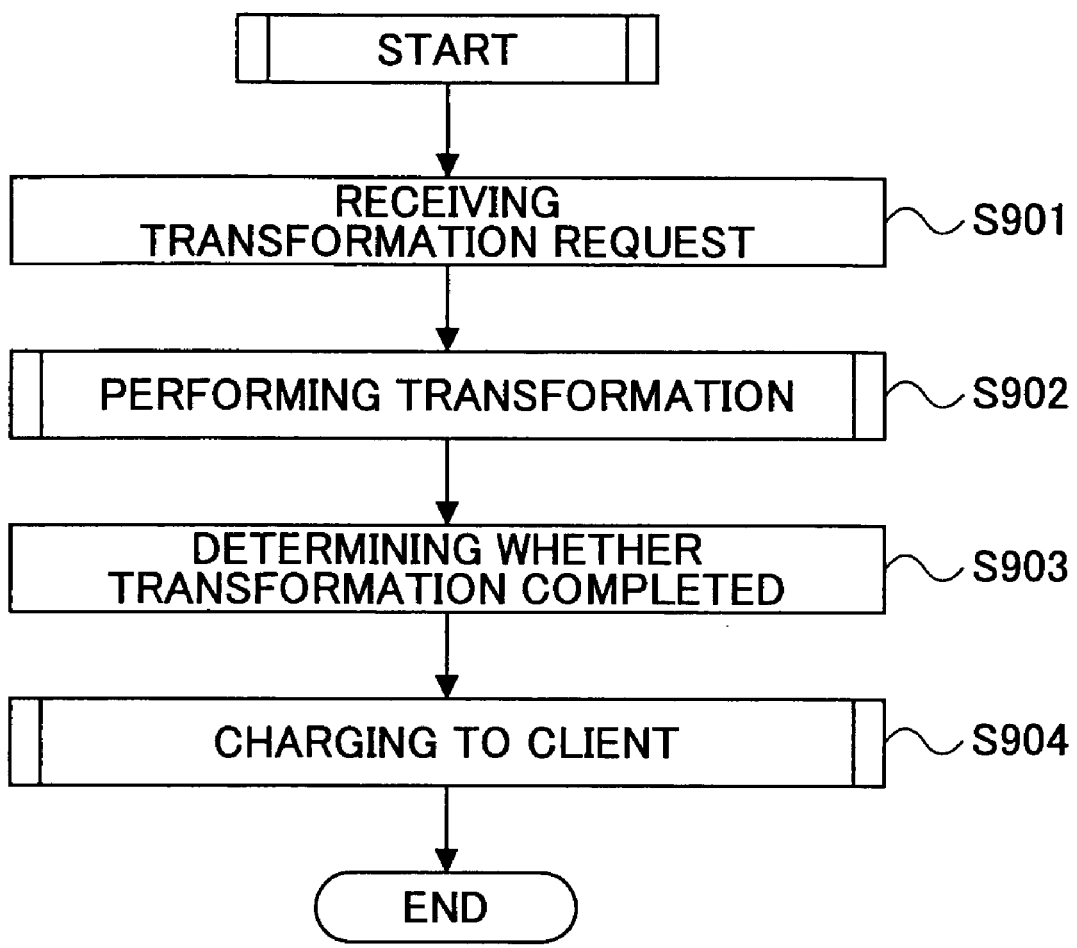
FIG. 17 is a flowchart for explaining an exemplary charging process.

FIG. 17 is a flowchart for explaining an exemplary charging process. The charging process shown in FIG. 17 starts with receipt of a transformation request from a client 302, and ends with charging to the client 302. The server 301 receives a transformation request in step S901, and performs the requested transformation in step S902. The server 301 determines that the requested transformation has been completed by the MLB 54 in step S903, then the server 301 transmits a charge request to the client 302 in step S904. Then, the process ends. The charge request corresponds to the "ChargeReq" shown in FIG. 5.

As described above, the present invention provides an apparatus for, and a method of providing an image transformation service by transforming the format of an image transmitted from another apparatus connected to the network.

The preferred embodiments of the present invention are described above. The present invention is not limited to these embodiments, but variations and modifications may be made without departing from the scope of the present invention.

This patent application is based on Japanese Priority Patent Application No. 2003-144573 filed on May 22, 2003, the entire contents of which are hereby incorporated by reference.

What is claimed is:

1. A method in an image transforming apparatus of transforming an image format of image data stored in an apparatus connected to the image transforming apparatus via a network, the method comprising the steps of:

receiving a request from the apparatus for format information;

providing the apparatus with the format information in response to the request for format information, the format information containing plural different image format transformation types that can be performed within the image transforming apparatus, each image format transformation type indicating a transformation from a respective initial image format to a different respective final image format;

receiving a request for transforming the image format of the image data from the apparatus, said request being sent from the apparatus based on the format information;

acquiring the image data from the apparatus;

transforming the image format of the image data acquired from the apparatus thereby to form format-transformed image data; and providing the format-transformed image data to the apparatus, wherein the format information provided to the apparatus further contains information of a transformation speed at which the image format of the image data can be transformed within the image transforming apparatus;

wherein the step of acquiring the image data comprises:

informing the apparatus of a first location in which the apparatus is to store the image data, the first location being indicated as a URL; and acquiring the image data from the first location in which the apparatus has stored the image data.

2. The method as claimed in claim 1, wherein the step of providing the format-transformed image data comprises the step of informing the apparatus of a second location in which the format-transformed image data are stored.

3. The method as claimed in claim 2, wherein the second location is indicated as a URL.

4. The method as claimed in claim 1, wherein the image format of the image data is transformed by hardware.

5. The method as claimed in claim 1, wherein the format information provided to the apparatus further contains information of a transformable range of magnification at which the image format of the image data can be transformed.

6. The method as claimed in claim 1, wherein a charge is made to the apparatus based on the transformation of the image data.

7. The method as claimed in claim 1, wherein, in the step of providing the apparatus with the format information, the format information provided to the apparatus depends on a kind of the apparatus.

8. The method as claimed in claim 1, wherein, in the step of providing the apparatus with format information, if the apparatus is not authorized to receive the format information, the format information is not provided to the apparatus.

9. The method as claimed in claim 1, wherein, in the step of transforming the image format of the image data, if a plurality of items of image data are to be transformed, the transformation of the items of image data is prioritized.

10. An image transforming apparatus, comprising:

a receiving unit that receives a request for format information from another apparatus which is connected to the image transforming apparatus via a network and which stores image data to be transformed;

an information providing unit that provides the format information to the other apparatus in response to the request for format information, the format information containing plural different image format transformation types that can be performed within the image transforming apparatus, each image format transformation type indicating a transformation from a respective initial image format to a different respective final image format;

an acquiring unit that acquires from the other apparatus the image data and a request for transforming the image format of the image data, said request being sent from the apparatus based on the format information;

a transforming unit that transforms the image format of the image data acquired from the other apparatus into format-transformed image data; and a data providing unit that provides the format-transformed image data to the other apparatus;

wherein the information providing unit provides format information containing information of a transformation speed at which the image format of the image data can be transformed within the image transforming apparatus, wherein the acquired unit provides a first location in which the other apparatus is to store the image data to be transformed and acquires the image data to be transformed that is stored in the first location by the other apparatus, the first location being indicated as a URL.

11. The image transforming apparatus as claimed in claim 10, wherein the data providing unit provides the format-transformed image data to the other apparatus by storing the format-transformed image data in a second location and informing the other apparatus of the second location so that the other apparatus can fetch the format-transformed image data.

12. The image transforming apparatus as claimed in claim 11, wherein the second location is indicated as a URL.

13. The image transforming apparatus as claimed in claim 10, wherein the transforming unit comprises hardware that can transform the image format of the image data.

14. The image transforming apparatus as claimed in claim 10, wherein the information providing unit provides format information containing information of a transformable range of magnification at which the image transforming apparatus can transform image format.

15. The image transforming apparatus as claimed in claim 10, further comprising:
    a charging unit that charges the other apparatus based on transformation of the image format.

16. The image transforming apparatus as claimed in claim 10, wherein the information providing unit provides different format information depending on a kind of the other apparatus.

17. The image transforming apparatus as claimed in claim 10, wherein if the other apparatus is not authorized to receive the format information, the information providing unit does not provide the format information thereto.

18. The image transforming apparatus as claimed in claim 10, wherein the transforming unit performs a transformation requested by the image transforming apparatus at priority over a transformation requested by the other apparatus.

19. The image transforming apparatus as claimed in claim 10, further comprising:
    hardware resources that are used for forming images; and
    computer programs that perform image processing.

20. A nontransitory computer readable recording medium encoded with computer executable instructions, which when executed by an image transforming apparatus, cause the image transforming apparatus to perform a method of transforming an image format of image data stored in an apparatus connected to the image transforming apparatus via a network, the method comprising:
    receiving a request from the apparatus for format information;
    providing the apparatus with the format information in response to the request for format information, the format information containing plural different image format transformation types that can be performed within the image transforming apparatus, each image format transformation type indicating a transformation from a respective initial image format to a different respective final image format;
    receiving a request for transforming the image format of the image data from the apparatus, said request being sent from the apparatus based on the format information;
    acquiring the image data from the apparatus;
    transforming the image format of the image data acquired from the apparatus thereby to form format-transformed image data; and
    providing the format-transformed image data to the apparatus, wherein the format information provided to the apparatus further contains information of a transformation speed at which the image format of the image data can be transformed within the image transforming apparatus;
    wherein the step of acquiring the image data comprises:
    informing the apparatus of a first location in which the apparatus is to store the image data, the first location being indicated as a URL; and
    acquiring the image data from the first location in which the apparatus has stored the image data.

21. A system comprising:
    an image transforming apparatus and a client apparatus which is connected to the image transforming apparatus via a network and which stores image data to be transformed, the image transforming apparatus comprising:
    a receiving unit that receives a request for format information from the client apparatus;
    an information providing unit that provides the format information to the client apparatus in response to the request for format information, the format information containing plural different image format transformation types that can be performed within the image transforming apparatus, each image format transformation type indicating a transformation from a respective initial image format to a different respective final image format, format information further containing information of a transformation speed at which the image format of the image data can be transformed within the image transforming apparatus;
    an acquiring unit that acquires from the other client apparatus the image data and a request for transforming the image format of the image data, said request being sent from the client apparatus based on the format information;
    a transforming unit that transforms the image format of the image data acquired from the client apparatus into format-transformed image data; and
    a data providing unit that provides the format-transformed image data to the client apparatus;
    wherein the client apparatus is configured to perform image transformation and compares a transformation speed at which the image format of the image data can be transformed within the client apparatus with the information of the transformation speed at which the image format of the image data can be transformed within the image transforming apparatus, and
    when the transformation speed of the client apparatus is lower than the transformation speed of the image transformation apparatus, the client apparatus requests the image transformation apparatus to transform the image format of the image data, and when the transformation speed of the client apparatus is equal to or greater than the transformation speed of the image transformation apparatus, the client apparatus transforms the image format of the image data,
    wherein the acquiring unit provides a first location in which the other apparatus is to store the image data to be transformed and acquires the image data to be transformed that is stored in the first location by the other apparatus, the first location being indicated as a URL.

* * * * *